May 24, 1932.  B. W. HANLE  1,859,870
DESK SET
Filed Aug. 20. 1928
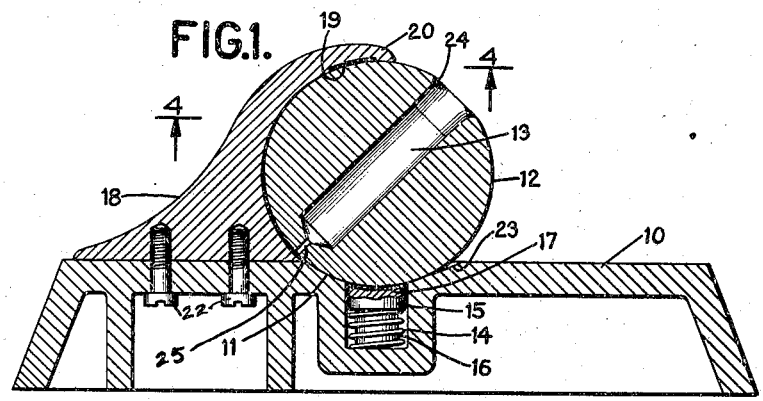
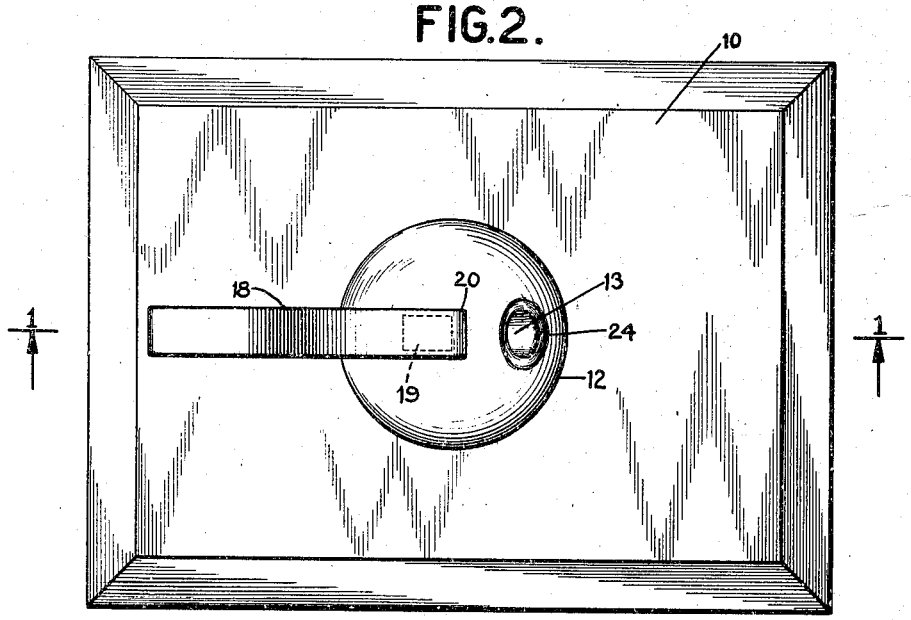
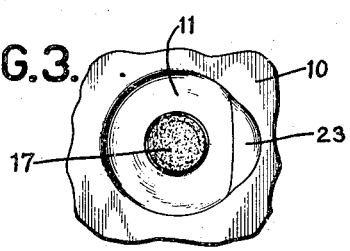
Inventor
Benjamin W. Hanle
By his Attorneys
Cooper, Kerr & Dunham Patented May 24, 1932

1,859,870

UNITED STATES PATENT OFFICE

BENJAMIN W. HANLE, OF ELIZABETH, NEW JERSEY, ASSIGNOR TO EAGLE PENCIL COMPANY, OF NEW YORK, N. Y., A CORPORATION OF DELAWARE

DESK SET

Application filed August 20, 1928. Serial No. 300,636.

This invention relates generally to improvements in what are known in the trade as desk sets, and has particular reference to improvements in the construction and general organization of such devices.

One of the objects is to provide a construction comprising an element containing a receptacle for a fountain or other pen and which is so constructed as to permit turning the element to various angular positions with respect to a supporting base, coupled with provisions for permitting a ready removal and replacement of the element whenever desired.

Another object is to provide an article of the character stated which is sturdy and free from parts which are likely to wear or get out of order, and which will present an attractive appearance, but which can, nevertheless, be manufactured at a relatively low cost.

With the foregoing and other objects in view, the invention consists in a novel construction and combination of parts, the novel features of which are pointed out in appended claims, and an illustrative embodiment of which is hereinafter described with references to the drawings accompanying and forming a part of this specification.

In said drawings:

Fig. 1 is a section on the line 1—1 of Fig. 2.

Fig. 2 is a top plan view of an article containing the invention.

Fig. 3 is a partial plan view of the base of the article shown in Fig. 2 and shows details having to do with the construction and assembly, as well as the operation of the device for its intended purpose.

Fig. 4 is a section substantially on the line 4—4 of Fig. 1.

The embodiment shown in the drawings comprises a base 10 which may be of any desired material, size or shape. In the drawings the base is shown in a form it might have if molded of rubber or suitable composition, but it is apparent that the base can be formed of a slab of material with suitable modifications in some of the other parts referred to later on.

The upper face of the base 10 is provided with a socket 11 conforming in shape with the curvature of a spherical member 12 containing a receptacle 13 for a pen. The pens used in such sets are usually of the fountain type although, of course, desk sets are not confined to use with pens of that kind.

Located centrally of the socket 11 is a tubular recess affording a seat for a spring 14 engaging under the head 15 of a plunger 16. The upper surface of the head 15 is preferably cupped to conform substantially to the curvature of the member 12. Fitted into the cup or recess in the head 15 of the plunger is a piece of material 17 which is preferably of a composition which will give a frictional contact with the member 12 and also, in case the member is made of material requiring it, prevent marring the surface of the member.

Projecting up from the base 10 is a curved arm 18 provided with a friction pad 19 engaging the periphery of the element 12. The inner surface of the arm 18 adjacent the element is curved to conform to the outline of the element, but preferably does not contact the element except at the upper end 20 of the arm. The curvature of the inner surface of the arm is, however, sufficiently close to the surface of the element 12 to assist in preventing the dislodgement of the element, particularly as the arm is long enough for its tip 20 to extend beyond the vertical axis of the element 12.

The embodiment illustrated has the arm 18 attached to the base 10 by screws 22. It is, however, clearly apparent that the arm might be integral with the base. In order to facilitate removal and insertion of the element 12 as for cleaning or to permit substitution of elements of different color or appearance, provision is made for such removal and insertion without disturbing the arm 18. This provision includes scooping the forward edge of the socket 11 as shown at 23 and chamfering or rounding the edges of the receptacle 13 after the manner indicated at 24.

When the parts are in the relations in which they are shown in Figs. 1 and 2, the element 12 may be removed by rotating it until the open end of the receptacle 13 is under the tip 20 of the arm 18. The element may then be removed by drawing it out through the scooped portion 23 of the socket 11. Replacing the element involves merely a reversal of the operations. During such removal and replacement the element 12 will, as it passes over the edge of the cup in the top of the head 15, depress the plunger 16 against the tension of its spring.

While the spherical element 12 can readily be turned in any direction, after it is inserted in position the cooperation of the plunger with the tip 20 of the arm 18, and with the friction pad 19, tends to limit the rotation of the element 12 to rotation on a vertical axis. As a result, a pen in the receptacle can be caused to extend out at various angles. However, when it is desired, for example, to lock the device up in a desk drawer, the element 12 may be turned against the friction of the pads 17 and 19 so that the pen will be in a horizontal position.

In order to permit the air to leave and enter the receptacle 13 readily when a fairly tight fitting pen is inserted and removed the receptacle has an air vent or opening 25 through the wall of the element 12. This opening also facilitates to a marked extent the work of washing out the receptacle to remove dirt and accumulations of ink.

From all of the foregoing it is apparent that the embodiment shown and described has the advantages above indicated as being desirable. It is also apparent that the embodiment referred to can be modified in respects other than the ones specifically mentioned herein, all of such modifications coming within the scope of the claims which follow.

What is claimed is:

1. A device of the character described comprising a base member provided with a socket, a spring pressed friction device mounted in said socket, an arm extending upward from the base and overhanging the socket and friction device, and a member, containing a pen receptacle, mounted in said socket and engaged by the friction device and overhanging arm, said socket having a clearance cut at its side to permit removal of said member from the socket.

2. A device of the character described comprising a base member provided with a socket, a spring pressed friction device mounted in said socket, an arm extending upward from the base and overhanging the socket and friction device, and a substantially spherical member mounted in said socket and engaged by the friction device and overhanging arm, said spherical member containing a tubular pen receptacle chamfered at its mouth, the socket having a clearance at its side to permit removal of the spherical member from its socket.

3. A device of the character described comprising a base member provided with a socket, a spring pressed friction device mounted in the socket, an arm on the base and overhanging the socket and friction device having a friction pad under the overhanging portion of the arm, and a substantially spherical member mounted in said socket and engaged by the friction device and by the overhanging arm and the friction pad carried thereby, said spherical member containing a tubular pen receptacle chamfered at its mouth, and the socket having a clearance at one side to permit removal of the spherical member when the pen receptacle is in register with the overhanging end of the aforesaid arm.

4. A device of the character described comprising a base member provided with a socket, a globular member supported in the socket and containing a pen receiving bore, an arm on the base overhanging the globular member and so constructed as normally to prevent removal of the globular element from the socket, friction devices in the socket and on the overhanging arm engaging the globular element, the socket having a clearance cut at its side to permit removal of the globular element when the pen receiving bore is in register with the overhanging end of the arm.

In testimony whereof I hereto affix my signature.

BENJAMIN W. HANLE.